(12) United States Patent
Weber et al.

(10) Patent No.: US 11,276,854 B2
(45) Date of Patent: Mar. 15, 2022

(54) LITHIUM ANODE AND METHOD FOR PRODUCING SAME

(71) Applicant: VOLKSWAGEN AKTIENGESELLSCHAFT, Wolfsburg (DE)

(72) Inventors: Dominik Weber, Braunschweig (DE); Andreas Lemke, Ummendorf (DE); Sylke Schilde, Vordorf (DE); Wolfgang Zipprich, Isenbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 182 days.

(21) Appl. No.: 16/421,890

(22) Filed: May 24, 2019

(65) Prior Publication Data
US 2019/0363350 A1 Nov. 28, 2019

(30) Foreign Application Priority Data
May 25, 2018 (DE) ...................... 10 2018 112 637.9

(51) Int. Cl.
*H01M 4/02* (2006.01)
*H01M 4/36* (2006.01)
(Continued)

(52) U.S. Cl.
CPC ......... *H01M 4/366* (2013.01); *H01M 4/0404* (2013.01); *H01M 4/386* (2013.01); *H01M 4/485* (2013.01); *H01M 4/661* (2013.01); *H01M 10/0525* (2013.01); *H01M 2004/021* (2013.01); *H01M 2004/027* (2013.01)

(58) Field of Classification Search
CPC ....................................................... H01M 4/02
See application file for complete search history.

(56) References Cited

U.S. PATENT DOCUMENTS

| | | | | |
|---|---|---|---|---|
| 6,103,416 A | * | 8/2000 | Bauerlein | ............. H01M 10/05 429/127 |
| 6,106,978 A | | 8/2000 | Takeuchi | |
| | | (Continued) | | |

FOREIGN PATENT DOCUMENTS

| | | |
|---|---|---|
| CN | 106058168 A | 10/2016 |
| CN | 106 450 434 A | 2/2017 |
| | (Continued) | |

OTHER PUBLICATIONS

Extended search report for European Patent Application No. 19176015.6, dated Oct. 7, 2019.
(Continued)

*Primary Examiner* — Jacob B Marks
(74) *Attorney, Agent, or Firm* — Pearl Cohen Zedek Latzer Baratz LLP

(57) ABSTRACT

A lithium anode for a lithium cell and/or lithium battery comprises: a current conductor layer, an anode active material and a coating, wherein the current conductor layer is embodied in the manner of a lattice with a conductor structure that defines open voids, the anode active material is arranged in the cavities between the conductor structure, and the coating covers the current conductor layer and the anode active material. The invention also relates to a method for manufacturing such a lithium anode.

16 Claims, 8 Drawing Sheets

(51) Int. Cl.
*H01M 4/04* (2006.01)
*H01M 4/38* (2006.01)
*H01M 4/485* (2010.01)
*H01M 4/66* (2006.01)
*H01M 10/0525* (2010.01)

(56) References Cited

U.S. PATENT DOCUMENTS

| | | | |
|---|---|---|---|
| 6,268,087 B1 | 7/2001 | Kim et al. | |
| 7,736,802 B1 | 6/2010 | Smyth | |
| 2006/0159999 A1* | 7/2006 | Kejha | H01M 4/13 429/254 |
| 2012/0114982 A1 | 5/2012 | Kenro et al. | |
| 2013/0189576 A1 | 7/2013 | Verbrugge et al. | |
| 2013/0309579 A1 | 11/2013 | Shimp et al. | |
| 2014/0227432 A1 | 8/2014 | Liu et al. | |
| 2015/0171398 A1* | 6/2015 | Roumi | H01M 10/4257 429/7 |
| 2015/0295246 A1 | 10/2015 | Son et al. | |
| 2015/0318553 A1 | 11/2015 | Brandt | |
| 2015/0365795 A1 | 12/2015 | Stefan et al. | |
| 2017/0288210 A1 | 10/2017 | Woehrle et al. | |
| 2018/0123526 A1 | 5/2018 | Grede et al. | |

FOREIGN PATENT DOCUMENTS

| | | |
|---|---|---|
| DE | 10 2013 200 749 A1 | 7/2013 |
| DE | 10 2012 212 788 A1 | 1/2014 |
| DE | 10 2012 112 186 A1 | 6/2014 |
| DE | 10 2013 201 853 A1 | 8/2014 |
| DE | 10 2014 226 390 A1 | 6/2016 |
| DE | 10 2015 212 220 A1 | 1/2017 |
| JP | 2013-214 460 A | 10/2013 |

OTHER PUBLICATIONS

Search report for German Patent Application No. 10 2018 112 637.9, dated Feb. 14, 2019.

* cited by examiner

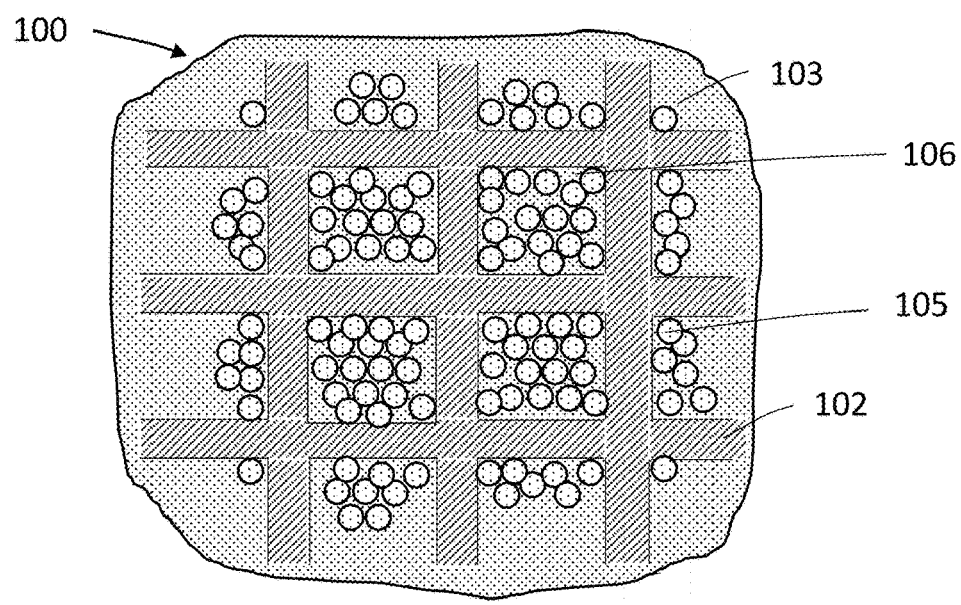
Fig. 14
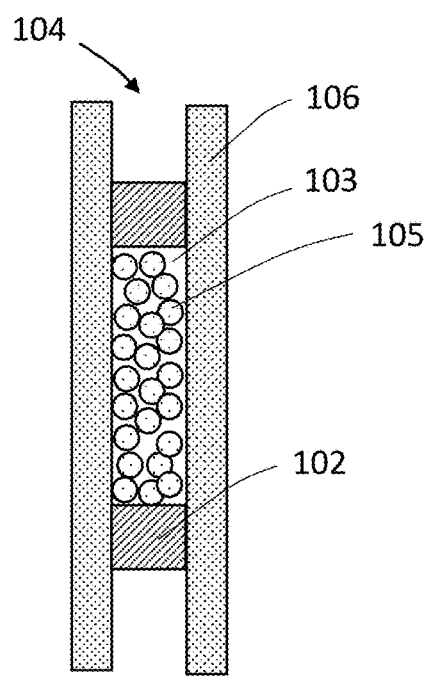 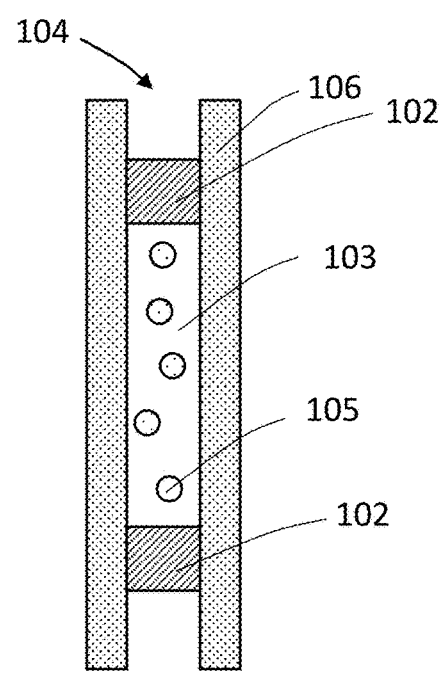
Fig. 15a                    Fig. 15b

LITHIUM ANODE AND METHOD FOR PRODUCING SAME

CROSS REFERENCE TO RELATED APPLICATION

This application claims priority from German Patent Application No. 10 2018 112 637.9, filed May 25, 2018, which is hereby incorporated by reference in its entirety.

FIELD OF THE INVENTION

The invention relates to a lithium anode for a lithium cell and/or a lithium battery having a current conductor layer, an anode active material, and a coating.

The invention further relates to a method for manufacturing same. The invention further relates to a lithium battery having such a lithium anode.

BACKGROUND OF THE INVENTION

So-called lithium batteries or also lithium-ion batteries are widely used for portable applications and for electric drives in motor vehicles. In this context, the term "lithium battery" includes both batteries with lithium metal anodes and those with lithiated graphite anodes.

The present application is concerned with the technology of rechargeable secondary lithium-ion batteries, as opposed to non-reusable primary batteries. However, the term "lithium battery" is also intended here to refer to such secondary batteries.

Lithium-ion batteries use carbon as a negative electrode material (when discharged: lithium anode) and metal-containing materials—generally metal oxides—as a positive electrode (when discharged: cathode assembly).

Lithium batteries are composed of a plurality of lithium cells that are constructed as follows: The lithium anode (first electrode) and the cathode assembly (second electrode) are separated from one another by a separator membrane but interconnected in a lithium ion-conducting manner by electrolytes permeating the electrodes. Anode and cathode are each connected to a current collector, which forms a current conductor layer. Conventional cells have a multilayer construction. A carbon material is applied to a current conductor layer on the anode side as the anode active material, and a cathode active material, which is generally formed by a metal oxide, is applied to a current conductor layer on the cathode side. A separator is arranged therebetween which separates the anode active material layer and the cathode active material layer from one another. A liquid or also solid electrolyte permeating the electrode active material enables lithium ions $Li^+$ to be transported between the electrodes.

The development of new lithium cells is aimed at achieving higher cell voltages, greater power, higher capacity (electrical charge), and safety through improved lithium ion intercalation and deintercalation or also through so-called "lithium plating," in which the deposition of metallic lithium at high charging currents is avoided, as well as at achieving a longer cycle duration and lifetime.

Several approaches exist in this regard: For instance, metallic lithium-enriched anode active materials, which can increase the theoretical capacity of corresponding lithium cells, are increasingly used. Such composite electrodes are known, for example, from DE 10 2012 212 788 A1 and DE 10 2014 226 390 A1. Porous lithium monoliths with a graphite coating are also known from DE 10 2015 212 220 A1.

There are also approaches in which permeable lattice structures or components made of porous material are used instead of electrically conductive foils or sheets. Lattice structures are known, for example, from U.S. Pat. No. 6,106,978 A1, U.S. Pat. No. 6,268,087 B, and US 20130309579, and porous metal as a current conductor is described in US 2015295246 A.

There are also approaches in which the lithium anode has a surface-structured current conductor or a surface-structured protective layer in which frame-like structures form bounded surface portions (cavities) that can be filled with anode active material. This is intended to improve the adhesion between the active material and the current conductor or the protective layer and to reduce or prevent mechanical impairment of the protective layer, e.g., detachment and/or bursting of the protective layer. The cavities can absorb just as much volume of anode active material, so that a cavity in the loaded state, in which the anode active material has a higher volume than in the unloaded state, is exactly filled up. However, the cavities have a bottom, so that ionic conduction through the bottom is not possible. The bottom also limits the volume expansion when loading in one direction.

Approaches also exist in which particles are introduced into sheet metal- or foil-type conductors with depressions (see DE 10 2012 112 186 A1). Here, too, ion conduction is prevented by the conductor.

SUMMARY OF THE INVENTION

It is therefore the object to provide a lithium anode for a lithium cell in which the drawbacks described above—particularly in connection with the change in volume during storage of the lithium ions in an anode active material—are at least partially mitigated.

In particular, one object can be regarded as being to provide lithium cells or lithium batteries in which no or only small global changes occur in the volume of the electrodes, i.e., the anode, when lithium ions are stored or released.

This object is achieved by a lithium anode according to the claims.

According to a first aspect, a lithium anode for a lithium cell and/or a lithium battery is provided that comprises the following:
a current conductor layer,
an anode active material, and
a coating.

The current conductor layer is embodied in the manner of a lattice with an open conductor structure that defines voids, and the anode material—e.g., a high-capacitance material such as Si—is arranged in the voids between the conductor structure, and the coating—e.g., a material with a lower specific capacity, such as graphite—covers the current conductor layer and the anode active material.

The targeted spatial arrangement of the anode active material in the voids between the conductor structure enables the anode active material to expand or contract there selectively during intercalation or deintercalation selectively without changing the volume, particularly the thickness of the layers. A largely homogeneous change occurs in the volume of the anode active material (e.g., silicon, see below), since the anode active material is distributed in a uniform and targeted manner in or at the anode.

The lifetime of such a cell can thus be extended, since inhomogeneous distributions or regions with a higher or lower anode active material content occur if the anode active material is distributed in the conductive coating (e.g., graphite with a lower specific capacity), resulting in uneven changes in volume that can destroy or damage the active layer. Furthermore, the open voids that ensure communication between the two sides of the current conductor layer allow ionic conduction to occur between these two sides. It is thus possible to compensate for different charge states between the two sides. Different charge states mean differences in the amount of already intercalated lithium ions or a lithium concentration that differs between the two sides that can thus be compensated for by the open voids. The intercalation and deintercalation can be further homogenized in this way. Such charge equalization is not possible with closed current conductor layers.

The perforation or open configuration of the voids in the current conductor layer provides additional space into which the anode active material can be introduced. The addition of the anode active material, e.g., a silicon material, can thus be done in a volume-neutral manner, since the volume gained by the perforation (open voids) is replaced and no additional volume of the current-conducting coating is required in the ion-conducting coating.

Additional advantageous embodiments of the invention follow from the subclaims and the following description of preferred exemplary embodiments of the present invention.

In a development of the invention, various configurations of the conductor structure are possible. For example, so-called expanded metal can be used in which foils or sheets are perforated by slots and then stretched without loss of material, so that the slots become meshes or voids that are suitable for receiving the anode active material.

Another possibility is to punch or perforate sheets or foils. This makes it possible to create precisely matched geometries of the voids in which the volume, shape, and extension of the voids can be tailored to the properties of the anode active material to be introduced. The current-conducting cross sections of the conductor structure also can be set precisely in this way.

There are also embodiments in which welded or woven wire arrangements are used with which the current conductor layer can be configured so as to be material-optimized and especially simple to manufacture from a production engineering perspective. At the same time, the diameters of the wires and the mesh size can matched exactly to one another.

Similar effects can also be achieved with three-dimensional conductor structures in which woven (or knitted) wire arrangements or wire scrim (fibrous non-oriented structures) are used to form the current conductor layer, for example. In such three-dimensional structures, the wires pass through the layer from one side to the other, and relatively thick-walled current conductor layers can be made using wires of relatively thin-diameter.

In the anode region, a metal material—particularly copper, which has excellent electrical properties (no intercalation or alloy behavior with lithium) and also conducts heat very well—is suitable for the formation of the conductor structure. The thermal processes that occur during cyclic intercalation and deintercalation can be compensated for very well in this way. That is, the transmission of heat from the lithium anode or from the lithium cell is thus easy to ensure. Copper materials are mechanically strong, sufficiently corrosion-resistant, and offer a good adhesion of the anode material in the bare state.

In one development of the invention, the anode active material is permeable to lithium ions in the voids of the current conductor layer. This makes it possible to improve the abovementioned charge equalization between the two sides of the current conductor layer.

The material in the voids can be introduced with a binder other than the coating over it. Binders that are suitable for silicon do not necessarily have perfect properties for graphite. A combination of two different binders can also have a positive effect on the lifetime of the anode.

The same applies to a cathode in which a prelithiation agent could be fixed with a binder that is more stable but not as flexible.

In one development, the anode active material comprises a metalloid material, particularly silicon. In contrast to pure carbon materials, silicon and silicon alloys (e.g., those in which the silicon is incorporated into a matrix of iron, magnesium, etc.) offer a higher capacity for the intercalation of lithium ions. The lithium can be used in the form of nanocrystals. It is possible to use nanofilms, nanoparticles, nanowires, or nanotubes or hollow particles in which the changes in volume are reduced and the cycle stability during charging and discharging can be further improved. In conjunction with the inventive arrangement in the open voids of the conductor structure, the lifetime and cycle stability can thus be increased without any restrictions on the choice of a suitable or optimized silicon material.

It is also possible to use a silicon-graphite composite material that combines the merits of both materials as the anode active material. Silicon offers a high capacity, and the carbon (e.g., graphite) ensures a good electronic conductivity and provides the necessary mechanical elasticity to compensate for the changes in volume (within the available volume of the voids).

Lifetime and performance data can be further influenced by means of the structure, morphology, and composition of the anode active material.

It is also possible to use a silicon-rich silicon oxide material as the anode active material, in which case the silicon offers a high capacity and the oxide matrix provides for additional stability of the anode, since a higher mechanical elasticity compensates for the changes in volume (within the available volume of the voids). Lifetime and performance data can be further influenced by means of the structure, morphology, and composition of the anode active material.

In one development of the invention, the anode active material is arranged in the voids of the conductor structure such that free volume is formed between the anode active material and the conductor layer and/or between the anode active material and the coating. In this way, the local change in volume within a cavity during intercalation or deintercalation of the lithium ions can be achieved without any global change in volume of the lithium cell. That is, the expansion of the lithium cells or the battery modules can be substantially or even completely avoided.

In a development in which the coating is arranged on both sides of the current conductor layer, the charge equalization can be homogenized. The cells can be produced in a more material-saving manner and have a longer lifetime.

In a development in which the coating is made of a lithium-ion-conducting material, the transporting of lithium ions to the anode active material, which is arranged in the voids of the current conductor layer, can be reliably achieved.

Carbon materials in particular are suitable for this purpose. Carbons are best suited due to their mechanical stability and good conductivity. They can be present as graphite, as hard carbon, as soft carbon, or as carbon tubes or nanotubes.

Hard carbons obtained from polymer resins in particular are very well suited for high currents. It is true that they offer only a small charge capacity (uptake of lithium ions) compared to natural graphite. Such an increased capacity is not necessary in the present case, however, since the charge capacity is ensured by the anode active material—i.e., the silicon—in the cavities of the current conductor layer.

Other anode materials with high current resistance include tin and $Li_4Ti_5O_{12}$ (LTO), a zero-strain material (almost no volume change on cycling) that is used in extremely long-lived cells but does not have a particularly high capacity and has a slightly increased voltage. Germanium can also positively influence the intercalation process, since the kinetics of the intercalation is improved.

A lithium battery according to the invention has a lithium anode according to the invention, a cathode or a cathode assembly, an electrolyte material that permeates a cathode and anode, and a separator that separates the lithium anode from the cathode or the cathode assembly.

Such a lithium battery can be produced with high capacity and long lifetime and with small changes in volume during charging cycles.

A method for manufacturing a lithium anode according to the invention comprises the following:
a. providing a current conductor layer that is embodied in the manner of a lattice with a conductor structure that defines open voids,
b. arranging anode active material in the voids between the conductor structure, and
c. coating the current conductor layer with a lithium-conducting material (e.g., graphite).

A lithium anode according to the invention can thus be produced in three simple method steps:

The provision of the current conductor layer comprises simple production methods such as joining methods and/or mechanical processing methods with which the conductor structure can be produced and prepared.

In a development of the method, the arrangement of the anode active material in the voids between the conductor structure can take place in a dipping process, for example, in which the anode active material wets the conductor structure and then fills the voids accordingly. Depending on the organization of the conductor structure and the preparation of the dipping liquid, free volume can thus also be created (through surface tension effects of the dipping liquid, for example) into which the anode active material can expand during intercalation.

Other methods for arranging the anode active material can be rolling processes in which a paste-type anode active material mixture is rolled or pressed into the voids, for example. It can also be provided doctor blade method, in which appropriate material is squeegeed into the voids.

It is also possible to combine dipping, rolling, or doctoring processes with one another.

Coated Anode

Another lithium anode for a lithium cell and/or a lithium battery comprises a current conductor layer, an anode active material, and a coating. Here, the current conductor layer embodied in the manner of a lattice with a conductor structure that defines open voids, and the anode active material is arranged as a layer (particularly as an enveloping layer) on the surface of the conductor structure and the coating covers the current conductor layer and thus also the enveloping anode active material.

Furthermore, a filling that fills out the voids is provided and is coupled with the anode active material and the coating (ionically and electronically conductive). The anode active material forms a layer having an increased lithium ion capacity that surrounds the conductor structure. By way of the geometry of the conductor structure (which is particularly made of copper; see above), the available surface that is coated with the anode active material or enveloped by same can be altered such that the available surface is optimized for coating with the anode active material.

In that case, the size, geometry, and the arrangement of the voids can be optimized such that improved lithium ion flow through the coating and through the filling in the anode active material and vice versa is ensured while simultaneously ensuring an electron flow by the conductor structure.

The features with respect to conductor structure, material (copper), and the anode active material (Si) correspond to the above-described features of the lithium anode according to the invention.

In one development of the invention, the filling is arranged in the conductor structure such that free volume is formed between the anode active material and the filling and/or the coating is formed on the current conductor layer and the filling such that free volume is formed between the anode active material and the coating. Such regions with free volume enable the coating to extend selectively into these regions of so-called free volume during the intercalation of lithium ions. As a result, only a local change in the volume of the anode active material takes place, and global expansion or shrinkage of the lithium anode or of the lithium cell is thus largely prevented.

The volume expansion that occurs when intercalating lithium into the anode active material occurs homogeneously around the conductor structure. This expansion is compensated for either by defined free volume available or by the fact that the lithium-conducting material—usually a carbon material—has a comparatively high bulk modulus of elasticity, which can compensate for these changes in volume. A global change in the volume of the lithium anode is largely avoided; at the same time, the coatings on the two sides of the conductor structure are securely connected to one another by means of the connecting fillings permeating the voids. This increases the mechanical stability of the lithium ion-conducting coating and thus also the lifetime of the lithium anode or of a cell that is provided with such a lithium anode.

The uniform enveloping of the conductor structure with the anode active material (silicon) also circumvents the problem of detachment of the active material, since the active material is completely enclosed by lithium ion-conducting material and is thus evenly supplied with lithium ions, so that a very balanced intercalation of lithium ions takes place and a homogeneous change in volume largely prevents local stresses in the anode active material (in the silicon layer). This effect also increases the lifetime of such a lithium anode or lithium cell that is provided with such a lithium anode.

The features with respect to coating (carbon material), a lithium battery, and a method for manufacturing such an anode correspond to the above-described features of the lithium anode according to the invention.

In a development of the method, the anode active material is applied by means of a physical or a chemical process. Usually, what are referred to as layer deposition processes are used, in which a distinction is made between physical processes and chemical processes (PVD-physical vapor deposition, CVD-chemical vapor deposition). Among the PVD processes, vapor deposition, spin-coating, or sputtering processes are prevalent.

During vapor deposition, the conductor structure fixed to a sample holder is placed in a vacuum chamber in which the anode active material (silicon) is heated and evaporated. The anode active material or silicon evaporated in this manner then precipitates on the copper structure and envelops it uniformly. To improve the process, the sample holder can be designed to be rotatable or movable so that a uniform coating of the conductor structure can occur.

Alternative coating methods can be sputtering and the ALD (atomic layer deposition) method. Only relatively small layer thicknesses can be achieved with this method, however.

According to another aspect of the method, the current conductor layer is provided with a lithium ion-conducting or lithium-conducting material (particularly a carbon material or lithium titanate, LTO, $Li_4Ti_5O_{12}$) in a dip and/or a rolling process, in which the filling of the voids is also formed with the lithium ion-conducting material (the carbon).

The conductor structure is completely embedded in the lithium-conducting material or the lithium ion-conducting material. This results in a homogeneous structure in which the coated lattice (the conductor structure) is completely embedded in the lithium-conducting material. The voids are filled and the coating is arranged on both sides of the lattice. Regions with free volume are optionally defined. However, a transition exists between the coatings of the two sides through the filling that permeates the voids. Different charge states, i.e., differences in the amount of already intercalated lithium or the lithium concentration between the two sides, are thus equalized.

Cathode Assembly

In modern lithium cells, it has been proposed to enrich the lithium anodes (lithium cells) with additional lithium (this is referred to as prelithiation). The intention is to prevent or reduce an irreversible loss of capacity during formation (SEI formation, first charge cycles) due to the bonding of the cyclizable lithium in the SEI formation. Solid Electrolyte Interface (SEI) refers to a layer that forms at the interface of the anode active material (silicon, carbon material, or other) of the anode and the electrolyte. In the process, lithium irreversibly incorporated.

Several possibilities are known for prelithiation. US 2014/227432 A provides for the use of solid metallic lithium powder in the anode active material. Approaches also exist in which lithium salts are introduced into the negative electrode (anode) for prelithiation (see US 2015/364795 A, for example). One approach to the prelithiation of the cathode is described in CN 1006058168 A. Here, nanoscale lithium fluoride is added to the cathode material.

However, the problem can arise during prelithiation of the cathode material that volume effects can occur in the cathode material during/after the first charging or during/after SEI formation that are caused by the lithium being removed from the prelithiation agent (which is incorporated into the SEI formation or migrates into the anode) and can cause structural problems there. There is therefore a need for improved cathode materials or cathode assemblies that permit optimized prelithiation in which the abovementioned drawbacks are at least partially eliminated.

The following cathode assembly achieves this object.

The cathode assembly for prelithiating a lithium cell comprises a current conductor layer, a lithium-based material, and a coating, wherein the current conductor layer is embodied in the manner of a lattice with a conductor structure that defines open voids, the lithium-based material is disposed in the voids between the conductor structure, and the coating covers the current conductor layer and the lithium-based material.

The configuration of the conductor structure corresponds to the conductor structures shown in connection with the lithium anodes described above.

In a development of the invention, the conductor structure is made of a metal material, particularly aluminum. Aluminum has very good current-conducting properties and is chemically suitable as a material for a cathode assembly in which materials such as LCO—lithium cobalt oxide ($LiCoO_2$); NMC—lithium nickel cobalt manganese oxide [$Li(Ni,Co,Mn)O_2$]; NCA—lithium nickel cobalt aluminum oxide [$Li(Ni,Co,Al)O_2$]; LFP—lithium iron phosphate ($LiFePO_4$); and LMO—lithium manganese oxide ($LiMn_2O_4$) (see below) are used.

In one development of the invention, the lithium-based material is provided in particular as lithium oxide, as lithium nitrate, as lithium nitride, and/or as a stabilized lithium powder. In particular, very good prelithiation results can be achieved with lithium nitrate.

By virtue of the fact that the lithium-based material is provided in the open voids of the conductor structure of the cathode assembly, the additional lithium volume can be introduced neutrally. Another advantage is that, after prelithiation, electrochemically inactive residues of the lithium-based material remain in the cavities and not in the volume of the actual cathode material with which the current conductor layer is coated and thus cannot block ionic or electronic paths in the coating.

The two-sided coating makes a cell structure possible in which two anodes can be operated with one cathode assembly.

The coating of the conductor structure or of the current conductor layer is made of a cathode active material, particularly materials such as LCO—lithium cobalt oxide ($LiCoO_2$); NMC—lithium nickel cobalt manganese oxide [$Li(Ni,Co,Mn)O_2$]; NCA—lithium nickel cobalt aluminum oxide [$Li(Ni,Co,Al)O_2$]; LFP—lithium iron phosphate ($LiFePO_4$); and LMO—lithium manganese oxide ($LiMn_2O_4$) offer especially favorable properties in the cathode assembly.

The manufacturing corresponds to the method described in connection with the lithium anodes.

The use of such a cathode assembly for the prelithiation of a lithium anode, a lithium cell, or a lithium battery makes it possible to compensate for the loss of active lithium, particularly in the SEI formation phase. The energy density of such a lithium-ion cell or a lithium-ion battery can thus be increased.

BRIEF DESCRIPTION OF THE DRAWINGS

Exemplary embodiments of the invention will now be described by way of example and with reference to the accompanying drawing, in which:

FIG. 14 shows a schematic representation of an exemplary embodiment of a cathode assembly according to the invention, FIG. 15a shows a sectional representation of the cathode assembly illustrated in FIG. 14, wherein the void defined by the conductor structure and the coating is completely filled, FIG. 15b shows a sectional representation of the cathode assembly illustrated in FIG. 14, wherein the void defined by the conductor structure and the coating is partially filled.

DETAILED DESCRIPTION OF THE INVENTION

Figure 1:
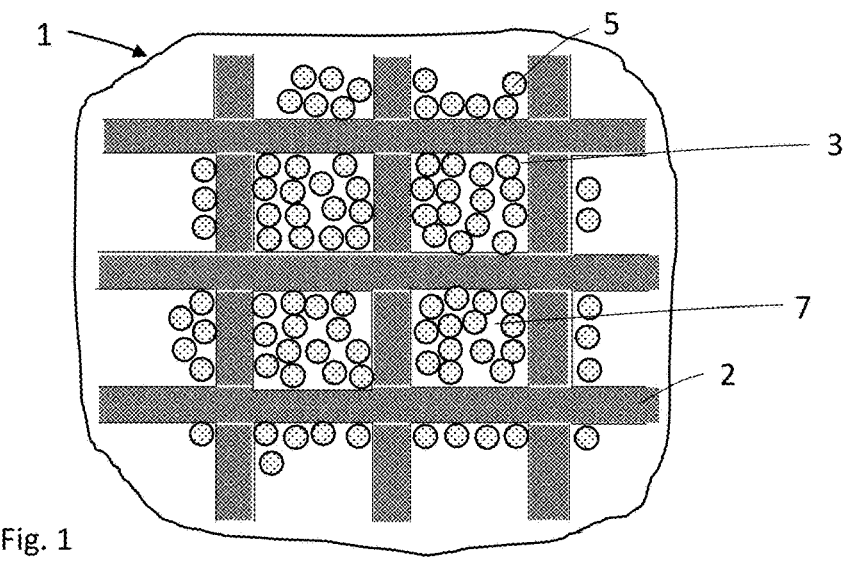
FIG. 1 shows a schematic representation of a cut-out of a first exemplary embodiment of a lithium anode according to the invention.
Figure 2:
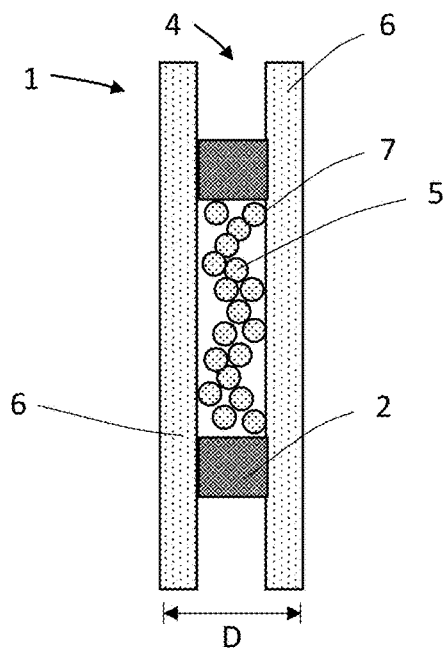
FIG. 2 shows a sectional view of the lithium anode illustrated in FIG. 1.

The view shown in FIG. 1 of a lithium anode 1 according to the invention is constructed as follows: a conductor structure 2 is formed here from a conductor lattice with rectangular meshes 3 that define open voids. The conductor structure 2 can be constructed from different materials (see below) and forms a substantially planar current conductor layer 4 (see FIG. 2).

Anode active material 5 that is made of a silicon material is arranged in the meshes 3. The current conductor layer 4 is provided on both sides with a coating 6 that is arranged so as to be in electrical contact with the conductor structure 2. The coating is made of a lithium-conducting material, particularly a carbon material, that can include the following materials: Graphite, hard carbon, soft carbon, carbon nanotubes, vapor-grown carbon fibers, and other anode materials that are suitable for lithium ion transport. The silicon material 5 is arranged in the mesh 3 such that free volume 7 is provided.

In this context, "free volume" is not necessarily to be understood as an open or empty void but can also be considered microscopically as a free volume into which the silicon material 5 can expand during the uptake of lithium ions (intercalation). The anode active material 5 (silicon material) is also in electrical contact with the conductor structure 2 and the coating 6.

It is also possible for the coating 6 to protrude partially into the voids 3 (meshes) of the conductor structure 2 and to touch or even at least partially enclose the anode active material 5.

The functioning of the lithium anode according to the first embodiment is as follows. During intercalation of lithium ions into the anode active material (the silicon material), a change in the volume of the anode active material 5 takes place—i.e., it expands. The free volume 7 in the open voids 3 provides the space required for this expansion. The total thickness D of the lithium anode 1 does not change in the process. In other words, the change in volume occurring locally in the voids 3 takes place only locally and does not cause any global expansion of the lithium anode 1.

Figure 3:
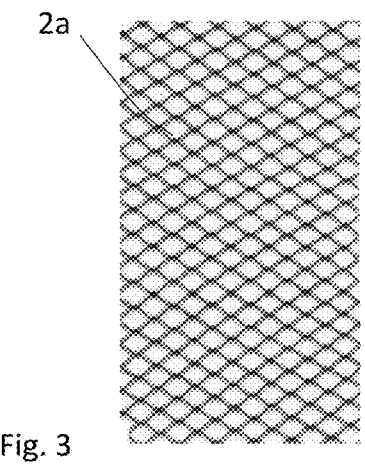
FIG. 3 shows a conductor structure made of expanded metal.

FIGS. 3 to 8 show possible alternatives of conductor structures. FIG. 3 shows a conductor structure 2a that is made of an expanded metal.

Figure 4:
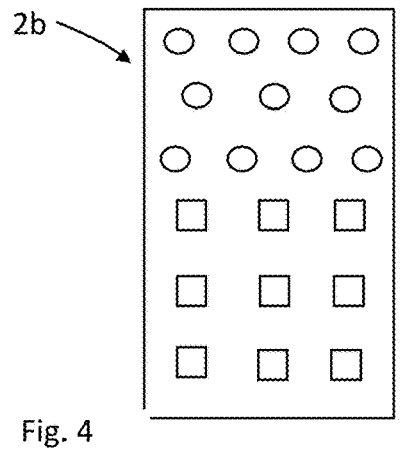
FIG. 4 shows a perforated or punched conductor structure that is embodied as a foil or sheet with different hole patterns.

FIG. 4 shows alternative hole or perforation patterns (round perforation, angular perforation) in a metal foil 2b. In addition to the illustrated round and square perforations, other hole or slot patterns can be provided that can be tailored to the desired properties of the lithium anode.

Figure 5:
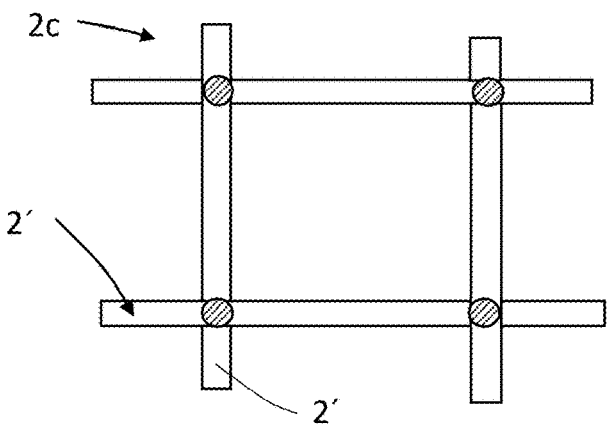
FIG. 5 shows a view of a conductor structure with welded conductor elements.
Figure 6:
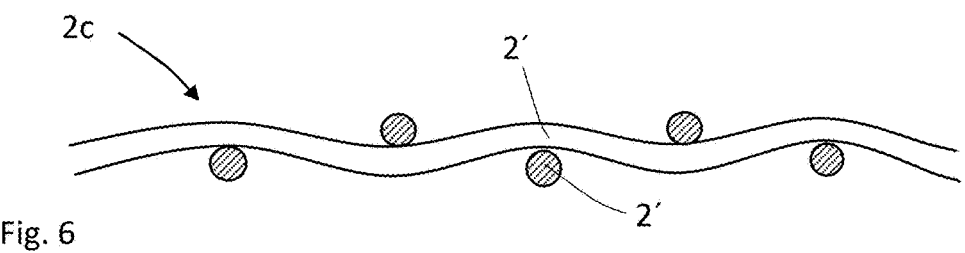
FIG. 6 shows a cross section of the conductor structure illustrated in FIG. 5.

FIGS. 5 and 6 show an open fabric structure 2c that is formed from round wires 2' that are optionally joined together at their points of contact (e.g., welded, soldered, pressed). Instead of the illustrated round wire cross sections, other cross-sectional geometries can also be used. For instance, it is possible to use oval- or band-shaped conductors instead of the wires.

Figure 7:
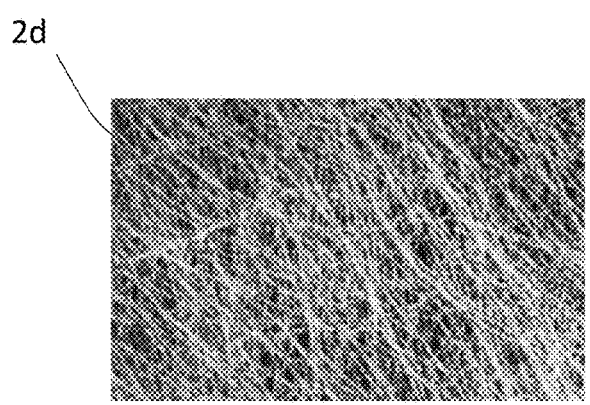
FIG. 7 shows conductor structure that is embodied as a nonwoven or wire scrim.

FIG. 7 shows a wire nonwoven structure 2d into whose voids the anode active material can be introduced.

Figure 8:
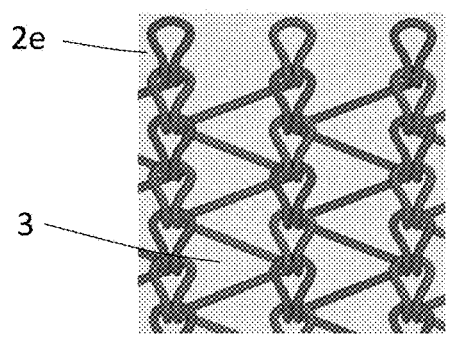
FIG. 8 shows a warp-knitted conductor structure.

FIG. 8 shows a woven or knitted structure 2e in which meshes 3 of three-dimensional extension can likewise be implemented through selection of a special knitting technique.

The properties of a lithium anode 1 that is embodied in this way can be determined particularly by the geometry of the conductor structure 2, i.e., by the extension of the current-conducting regions (thickness and width) as well as by the size and geometry of the open voids in which the anode active material is arranged. The amount of anode active material can thus also be controlled, so that corresponding free volume 7 is available to accommodate the expansion of the anode active material 5 (of the silicon material) during intercalation.

Figure 9:
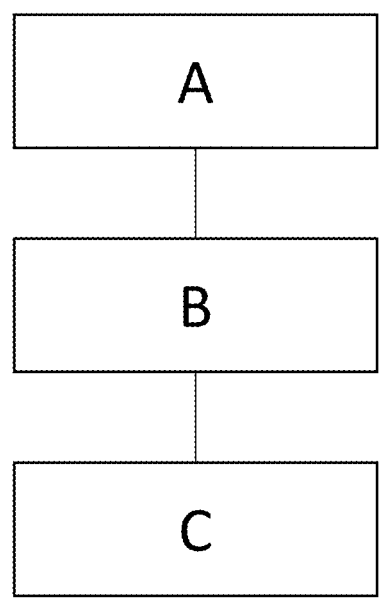
FIG. 9 shows a schematic representation of a method for manufacturing a lithium anode according to the invention.

FIG. 9 shows the process sequence of a method according to the invention for manufacturing a lithium anode according to the first exemplary embodiment. The method comprises Step A—Providing a current conductor layer 4 that is embodied in the manner of a lattice with a conductor structure 2 that defines open voids 3, Step B—Arranging anode active material 5 in the voids 3 between the conductor structure 2, and Step C—Coating the current conductor layer 4 with a lithium-conducting material 6, which can optionally also have storage properties.

Step A optionally comprises the provision, production, and/or preparation of the conductor structure 2 by means of a joining method and/or a mechanical processing method. Typical joining methods here are welding, pressing, soldering, and possibly also gluing. Typical mechanical processing methods here are stamping or cutting processes with the aid of which the voids are produced from a metal foil or a metal sheet, but also knitting, weaving, or other arrangement processes in which current-conducting wires are put into the desired shape and arrangement (see FIGS. 5 to 8).

Step B of the method comprises a dipping process with which the anode active material is arranged in the voids 3 of the conductor structure 2. The anode active material can also be filled in the voids 3 by rolling or squeegeeing.

Figure 10:
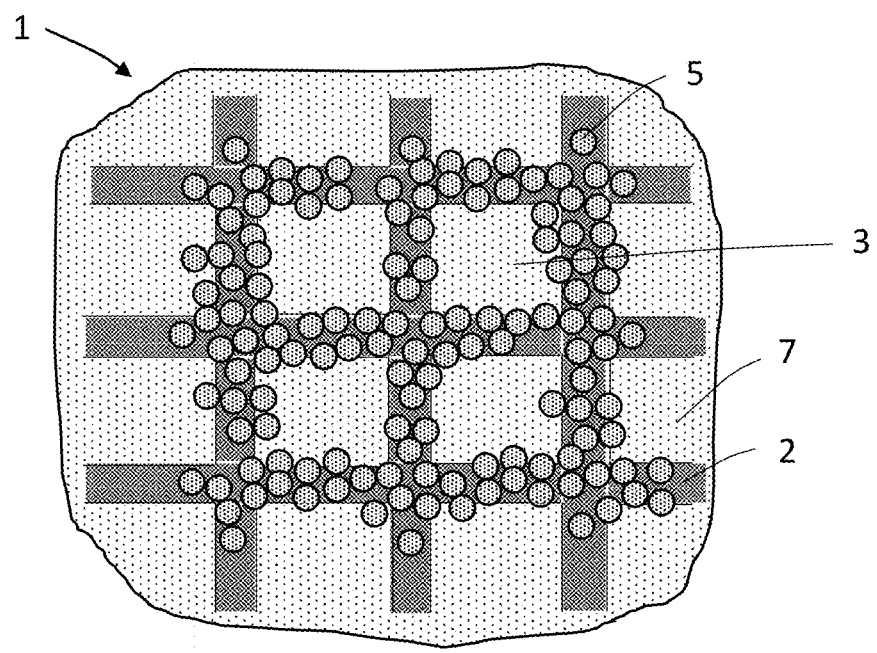
FIG. 10 shows a schematic representation of a second exemplary embodiment of a lithium anode.
Figure 11:
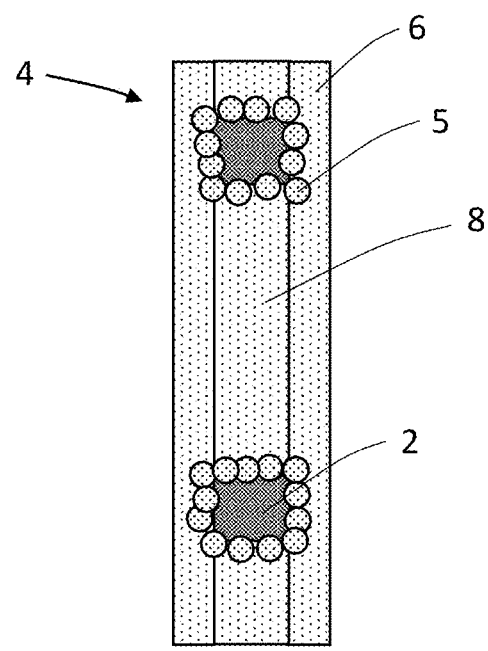
FIG. 11 shows a sectional representation of the lithium anode illustrated in FIG. 10.

FIG. 10 shows a second exemplary embodiment of a lithium anode 1 in which the anode active material is arranged differently. The lithium anode 1 shown here also comprises a conductor structure 2 that defines open cavities 3 and is an essential component of the current conductor layer 4 (see FIG. 11). Here, however, in contrast to the first exemplary embodiment, the anode active material (the silicon material) 5 is arranged as a layer on the surface of the conductor structure, so that it envelops the conductor structure. Analogously to the first exemplary embodiment, a coating 6 is likewise provided here, as well as a filling 8 of the cavities 3 of the conductor structure. The coatings 6 and 8 are made of a lithium ion conductive material, particularly of a carbon material (see above). Here, too, free voids are provided which enable local expansion of the anode active material during intercalation. The expansion can take place in the open voids 3, for example. It can also occur in microscopic free volume in the filling 8 and in the coating 6, which are each coupled in an electrically conductive manner with the anode active material. The enveloping coating of the conductor structure 2 with anode active material 5 enables particularly age-resistant coupling with the conductor structure. The changes in volume that occur during intercalation and deintercalation do not cause any local effects of detachment from the conductor structure, or they reduce these effects, unlike with planar, impermeable conductor structures. Suitable conductor geometries for these conductor structures are the same as described above in connection with FIGS. 3 to 8.

Figure 12:
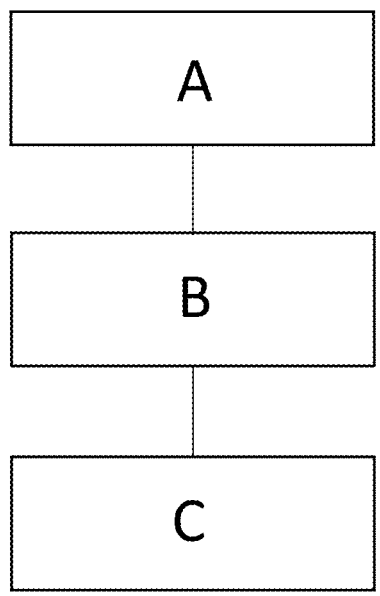
FIG. 12 shows a schematically illustrated method sequence for manufacturing the lithium anode illustrated in FIG. 10.

A method for manufacturing a lithium anode according to the second exemplary embodiment (see FIG. 12) according to the present invention comprises the steps A—Providing a current conductor layer that is embodied in the manner of a lattice with a conductor structure that defines open voids, B—Arranging anode active material on the conductor structure, i.e., the enveloping coating of the individual conductor portions, and C—Coating the current conductor layer with a lithium-conducting material.

Step A also comprises the above-described provision, production, and/or preparation of the conductor structure by means of a joining method and/or a mechanical processing method.

Figure 13:
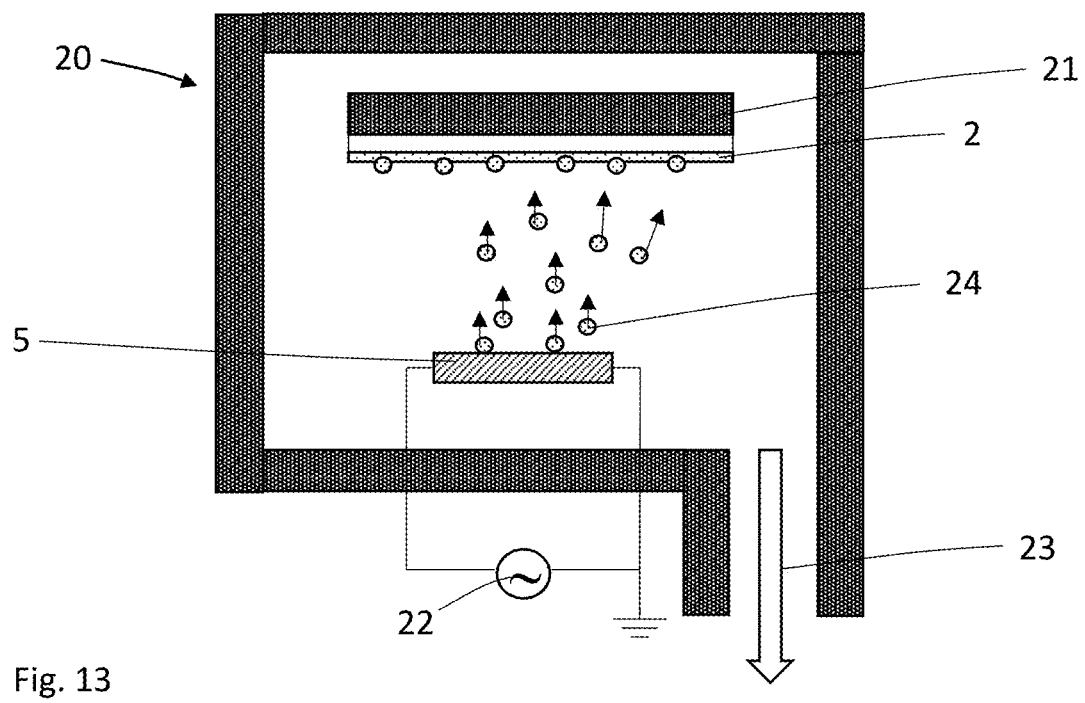
FIG. 13 shows a schematic representation of a coating method for manufacturing a lithium anode according to the invention.

The arrangement of the anode active material 5 on the conductor structure 2 comprises a physical and/or a chemical process and, in particular, a vapor deposition process shown in FIG. 13. A conductor structure 2 is arranged in an evacuatable coating chamber 20 that is fixed to a slide 21. In order to improve the coating result, this slide can be arranged so as to be movable or rotatable in the chamber 20. The silicon material 5 is vaporized by means of a heater 22 and precipitates on the conductor structure 2 in the chamber, which is evacuated by means of a vacuum pump 23. Optionally, the vapor deposition result can be improved by applying a voltage between the anode active material and the conductor structure, so that the vaporized particles 24 can be aimed specifically at the conductor structure.

Cathode Assembly

FIG. 14 shows a schematic view of an exemplary embodiment of a cathode assembly 100 that is suitable for the prelithiation of a lithium cell. It comprises a conductor structure 102 that is embodied in the manner of a lattice and has meshes 103 that define open voids in the conductor structure. These form a current conductor layer 104. A lithium-based material 105 is arranged in the open voids (meshes 3). The current collector layer 104 is provided with a coating 106 on both sides, or at least on one side. The conductor structure 102 is preferably made of an aluminum material (e.g., nickel, gold, platinum, zirconium, titanium, tantalum, various steels, and alloys such as Monel, conductive hardened carbon, and polymer-penetrated conductive fiber composites).

The structure and configuration of the conductor structure 102 is analogous to that described above in connection with the lithium anodes 1. As an alternative to the lattice structure shown in FIGS. 14 and 15, it can also be embodied with a rectangular conductor cross section corresponding to the variants illustrated in FIGS. 3 to 8.

The lithium-based material is made of a lithium-containing material such as lithium nitrate, lithium oxide, a lithium nitride, or even a stabilized lithium powder. It completely or partially fills the void defined by the conductor structure and the coating 106 (see FIGS. 15a and 15b).

The coating 106 is made of a suitable cathode active material comprising one of the following materials, for example:

LCO—Lithium Cobalt Oxide ($LiCoO_2$);
NMC—Lithium Nickel Cobalt Manganese Oxide [Li(NiCoMn)$O_2$];
NCA—Lithium Nickel Cobalt Aluminum Oxide [Li(NiCoAl)$O_2$];
LFP—Lithium Iron Phosphate ($LiFePO_4$), and
LMO—Lithium Manganese Oxide ($LiMn_2O_4$).

The lithium-based material 105 in the voids 103 is used to prelithiate a lithium anode—e.g., in order to compensate for the loss of lithium during the formation of an SEI layer in the first charging cycles. A portion of the lithium-based material 105 is consumed, and additional free volume is created in the void 103 (see FIG. 15b). However, the degradation of lithium-based material from the void does not result in a change in the volume of the cathode assembly as a whole. That is, no change occurs in the volume of a cathode assembly of a lithium battery that is embodied in this way or that is provided accordingly with such a cathode assembly.

The manufacturing method is analogous to the method described in connection with FIG. 9 for manufacturing a lithium anode.

It comprises the steps:

A—Providing a current conductor layer that is embodied in the manner of a lattice with a conductor structure that defines open voids, B—Arranging lithium-based material in the voids between the conductor structure, and C—Coating the current conductor layer with a cathode active material.

As described in connection with the first exemplary embodiment of a lithium anode, the provision of the current conductor layer likewise includes the production and the preparation of the conductor structure by means of the joining methods or mechanical processing methods mentioned there.

The lithium-based material can also be arranged in the void by means of a dipping, rolling, or squeegeeing method. Coating the conductor structure 102 on both sides makes it possible to combine the cathode assembly with two corresponding lithium anodes in order to form a lithium cell.

Lithium-Ion Cell

Figure 16:
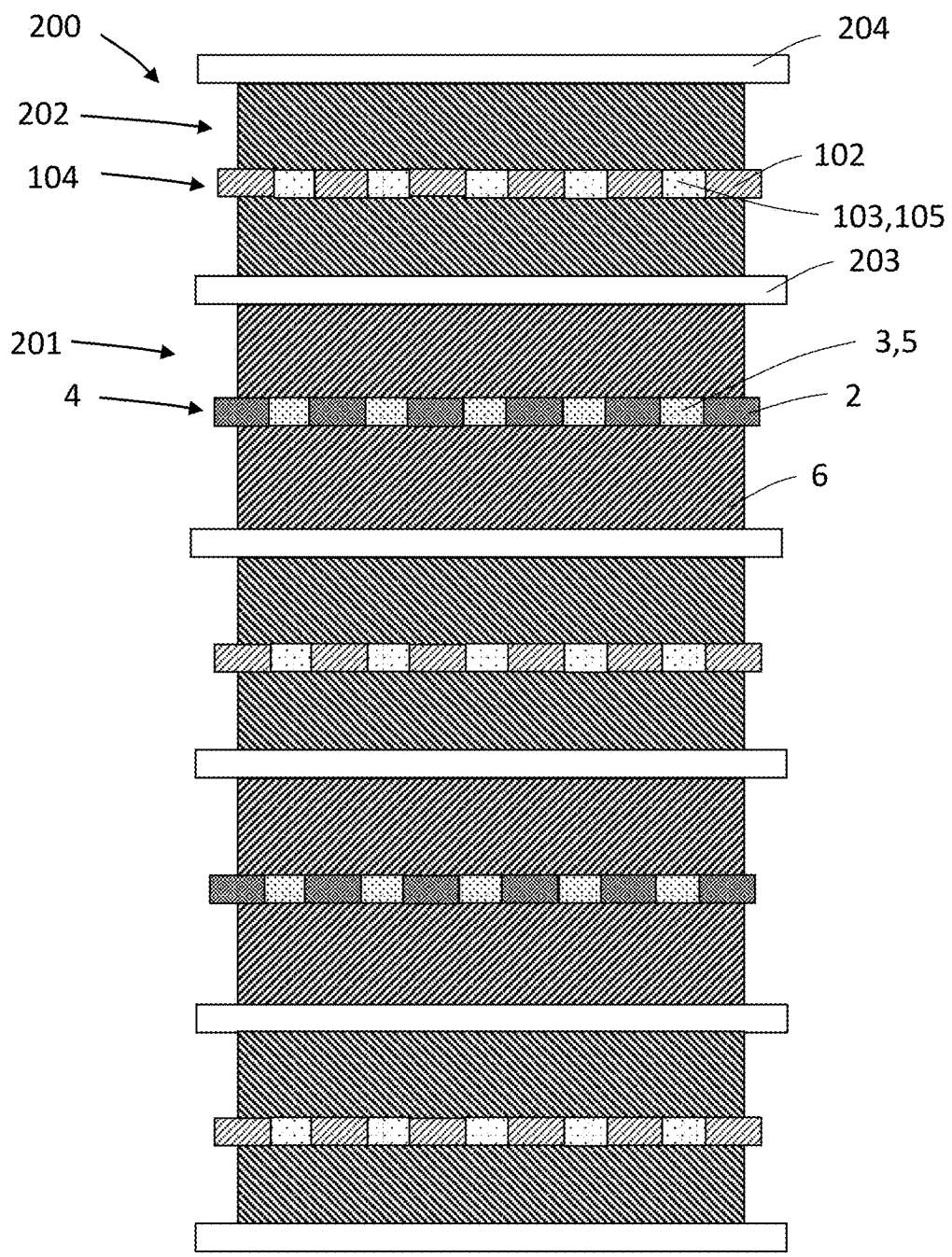
FIG. 16 shows a schematic representation of a lithium-ion cell according to the invention with lithium anodes according to a first exemplary embodiment and a cathode assembly according to the invention.

FIG. 16 shows a multilayer lithium-ion cell 200 with a multilayer construction of first electrodes 201, which are embodied as lithium anodes, and second electrodes 202, which are embodied as cathode assemblies. The electrodes are each separated from one another by a separator 203 and permeated as a whole by a solid or liquid electrolyte material (not shown) for the purpose of lithium ion transport. The first electrode 201 comprises a current conductor layer 4, and the second electrode comprises a current conductor layer 104.

The current conductor layer 4 of the first electrode 201 comprises a conductor structure 2 that is described in detail above and whose meshes 3 are filled with a silicon material as an anode active material 5. The current conductor layer 4 is provided on both sides with a coating 6 that is made a lithium ion-conducting material described above, particularly a carbon.

The voids 103 of the current conductor layer 104 and the conductor structure 102 of the second electrode 202 are filled with a lithium-based material 105 whose composition is indicated in connection with the cathode arrangement 100 described above.

The lithium-ion cell 200 illustrated in FIG. 16 comprises two first electrodes (lithium anodes) 201 and three second electrodes (cathode assembly) 202, each of which is alternately arranged. The outer surfaces are sealed with covers 204. The function of such a lithium-ion cell is inherently known.

That being said, the following invention-specific features arise. In the first charging cycles, the lithium-based material 105 in the mesh 103 serves to provide additional lithium, which is incorporated into the anode active material particles 5 and the coating 6 during the formation of an SEI and is no longer available for the actual cell cyclization. This can be used to limit or prevent a loss of capacity. At the same time, this lithium substitution is performed in a volume-neutral manner from the mesh 103, the geometry of which does not change during this process. This means that the geometry, and in particular the thickness, of such a lithium-ion cell 200 does not change during this process.

The same applies to the process of intercalating lithium ions into the anode active material 5, which takes place in the meshes 3 of the first electrodes (lithium anode) 201. As described in detail above, free volume is present there which compensates for the volume increase that occurs during intercalation. This process also takes place in an overall volume-neutral manner, so that a geometrically stable and, in particular, volume-stable lithium-ion cell 200 can be provided.

Figure 17:
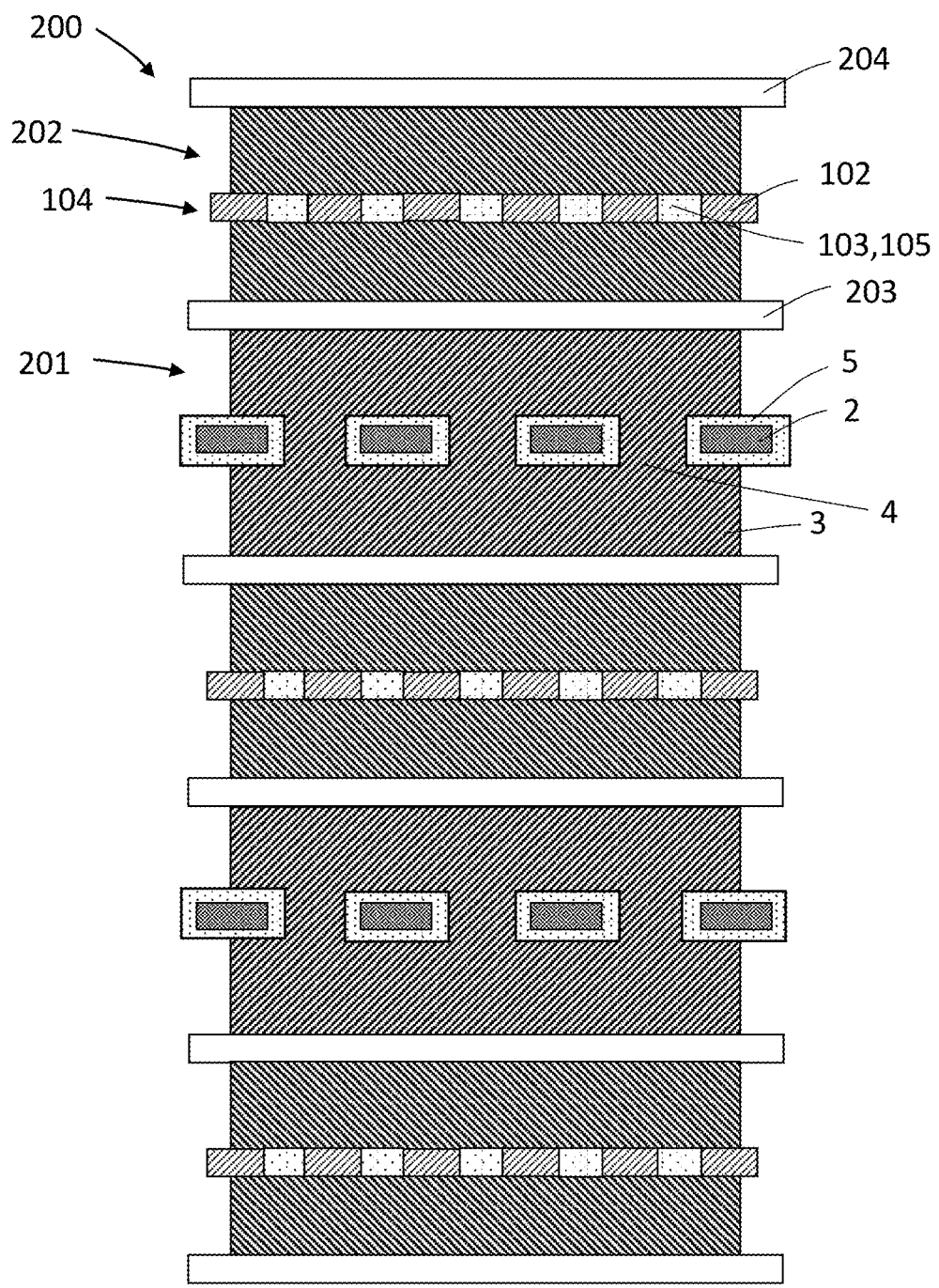
FIG. 17 shows the lithium-ion cell with lithium anodes according to a second exemplary embodiment.

FIG. 17 shows an alternative construction in which the first electrode 201 has a lithium anode according to the second exemplary embodiment described above. Here, the anode active material 5 is not arranged in the meshes 3—i.e., in the open voids of the conductor structure 2, but rather as the layer 5 that envelops the conductor structure and in which the lithium ions are likewise embedded in a substantially volume-neutral manner during intercalation.

The meshes 3 are filled with the same material of which the coatings 6 are made, namely a (particularly carbonaceous) material for transporting lithium ions.

In other embodiments, the embodiments shown in FIGS. 17 and 16 can be combined with one another. Accordingly, it is possible to provide a conductor structure 2 that is enveloped with anode active material 5 and a conductor structure in which the voids (meshes 3) are filled with the electrode active material 5.

In particular, lithium anodes having the following properties can also be provided:

A lithium anode (1) for a lithium cell (200) and/or lithium battery (200), comprising:
  a current conductor layer (4),
  an anode active material (5), and
  a coating (6), wherein the current conductor layer (4) is embodied in the manner of a lattice with a conductor structure (2) that defines open voids (3), the anode active material (5) is arranged as a layer on the surface of the conductor structure (2) and the coating (6) covers the current conductor layer (4) and hence the anode active material (5), and a filling is provided in order to fill out the voids (3) that is coupled with the anode active material (5) and the coating (6).

The lithium anode (1) as set forth in any one of claims 1 to 5, wherein the filling is arranged in the conductor structure such that free volume (7) is formed between the anode active material (5) and the filling and/or the coating (6) is formed on the current conductor layer (4) and the filling such that free volume (7) is formed between the anode active material (5) and the coating (6).

The following method steps can also be carried out for the production thereof:

A method for manufacturing a lithium anode (1) as set forth in any one of the claims, comprising:
  Providing a current conductor layer (4) that is embodied in the manner of a lattice with a conductor structure (2) that defines open voids (3),
  Arranging anode active material (5) on the conductor structure (2); and
  Coating the current conductor layer (4) with a lithium-conducting material.

A method in which the arranging of the anode active material (5) on the conductor structure (2) comprises a physical or a chemical or an electrochemical process, particularly a thermal vapor deposition process in an evacuated vapor deposition system (PVD), a chemical vapor deposition from corresponding precursor compounds (CVD) or electrochemical deposition (plating, molten-salt electrolysis) of the material in an immersion bath embodied as a galvanic cell with silicon-containing electrolyte.

In principle, the following methods can also be employed:
Thermal vaporization (also called vapor deposition)
Electron beam evaporation
Laser beam vaporization (pulsed laser deposition, pulsed laser ablation): Atoms and ions are vaporized by a short, intense laser pulse.
Arc evaporation (Arc PVD): Atoms and ions are extracted from the starting material by a strong current that flows between two electrodes during an electrical discharge (as in a flash), and then converted to the gas phase.
Molecular beam epitaxy
Sputtering (sputter deposition, cathodic sputtering): The starting material is atomized by ion bombardment and converted to the gas phase.
Ion Beam-Assisted Deposition (IBAD)
Ion plating
ICB technology (ionized cluster beam deposition)

Lithium-ion cells with the following properties can be provided:

A lithium-ion cell (200) for a lithium battery, comprising:
  a first electrode (201), which is embodied as a lithium anode (1), and
  a second electrode (202), which is embodied as a cathode assembly (100),
  at least one of the first and second electrodes (201, 202) having:
    a current conductor layer (4, 104),
    a functional material (5, 105), and
    a coating (6, 106), wherein
  the current conductor layer (4, 104) is embodied in the manner of a lattice with a conductor structure (2, 102) that defines open voids (3, 103), the functional material (5, 105)

is disposed in the voids between the conductor structure (2, 102), and the coating (6, 106) covers the current conductor layer (4, 104) and the functional material (5, 105).

A lithium-ion cell (200), in which the functional material (5, 105) is arranged in the voids (3, 103) of the conductor structure (2, 102) such that free volume (7, 107) is formed between the functional material (5, 105) and the conductor layer and/or free volume (7, 107) is formed between the functional material (5, 105) and the coating (6, 106).

A lithium-ion cell (200), in which the functional material (5) is arranged on a first electrode (201) as a layer on the surface of the conductor structure (2) and covers the coating (6), the current conductor layer (4), and hence the functional material (5), and a filling is provided in order to fill out the voids (3) that is coupled with the functional material (5) and the coating (6).

The current conductor layer (4, 104) is embodied in the manner of a lattice with a conductor structure (2, 102) that defines open voids (3, 103), the functional material (5, 105) is disposed in the voids between the conductor structure (2, 102), and the coating (6, 106) covers the current conductor layer (4, 104) and the functional material (5, 105).

LIST OF REFERENCE SYMBOLS 1 lithium anode
2 conductor structure
2' conductor portion
2a expanded metal
2b metal foil
2c fabric structure
2d wires
2d nonwoven structure
2e knitted structure
3 meshes (open voids)
4 current conductor layer
5 anode active material (silicon material)
6 coating
7 free volume
8 filling
20 chamber
21 slide
22 heater
23 vacuum pump
24 silicon particles (vaporized)
100 cathode assembly
102 conductor structure
103 mesh (open void)
104 current conductor layer
105 lithium-based material
106 coating
107 free volume
200 lithium-ion cell
201 first electrode
202 second electrode
203 separator
204 cover

The invention claimed is:

1. A lithium anode for a lithium cell and/or lithium battery, comprising:
    a current conductor layer,
    an anode active material, and
    a coating,
    wherein the current conductor layer is embodied in the manner of a lattice with a conductor structure that defines open voids, the anode active material is disposed in the voids between the conductor structure, and the coating covers the current conductor layer and the anode active material, and
    wherein the anode active material is arranged in the voids such that free volume is formed between the anode active material and the conductor structure and/or free volume is formed between the anode active material and the coating.

2. The lithium anode as set forth in claim 1, wherein the conductor structure comprises one of the following structures: expanded metal; perforated, punched, and/or slotted sheet metal; perforated, punched, and/or slotted metal foil; welded wire arrangement; woven wire arrangement; knitted wire arrangement; and wire scrim.

3. The lithium anode as set forth in claim 1, wherein the conductor structure comprises a metallic material, particularly copper.

4. The lithium anode as set forth in claim 3, wherein the metallic material comprises copper.

5. The lithium anode as set forth in claim 1, wherein the anode active material is permeable to lithium ions in the voids of the current conductor layer.

6. The lithium anode as set forth in claim 1, wherein the anode active material comprises a metalloid material, particularly Si.

7. The lithium anode as set forth in claim 6, wherein the metalloid material comprises Si.

8. The lithium anode as set forth in claim 1, wherein the coating is arranged on both sides of the current conductor layer.

9. The lithium anode as set forth in claim 1, wherein the coating is made of a lithium ion-conducting material.

10. The lithium anode as set forth in claim 9, wherein the lithium ion-conducting material comprises a carbon material and/or lithium titanate, LTO ($Li_4Ti_5O_{12}$).

11. The lithium anode as set forth in claim 10, wherein the carbon material comprises one of the following materials: graphite, hard carbon, soft carbon, and carbon tubes.

12. A lithium battery, comprising a lithium anode as set forth in claim 1, a cathode, an electrolyte material, and a separator that separates the lithium anode and the cathode from one another.

13. A method for manufacturing a lithium anode as set forth in claim 1, comprising:
    providing a current conductor layer that is embodied in the manner of a lattice with a conductor structure that defines open voids,
    arranging anode active material in the voids between the conductor structure; and
    coating the current conductor layer with a lithium-conducting material.

14. The method as set forth in claim 13, wherein the provision of the current conductor layer comprises the provision, production, and preparation of the conductor structure by means of a joining method and/or a mechanical processing method.

15. The method as set forth in claim 14, wherein the arrangement of the anode active material in the voids between the conductor structures comprises a dipping process.

16. The method as set forth in claim 15, wherein the arrangement of the anode active material in the voids between the conductor structures comprises a rolling process.

* * * * *